US008253759B2

(12) United States Patent
Brunner (10) Patent No.: US 8,253,759 B2
(45) Date of Patent: *Aug. 28, 2012

(54) METHOD AND APPARATUS FOR ANTI-ALIASING SCAN CONVERSION

(75) Inventor: Ralph Brunner, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,903

(22) Filed: Aug. 26, 2011

(65) Prior Publication Data

US 2011/0311160 A1 Dec. 22, 2011

Related U.S. Application Data

(60) Continuation of application No. 12/271,817, filed on Nov. 14, 2008, now Pat. No. 8,013,872, which is a division of application No. 10/328,546, filed on Dec. 24, 2002, now Pat. No. 7,453,470.

(51) Int. Cl.
*G09G 5/00* (2006.01)
(52) U.S. Cl. ....................... 345/611
(58) Field of Classification Search ........... 345/611–616
See application file for complete search history.

(56) References Cited

U.S. PATENT DOCUMENTS

| 5,719,595 | A | 2/1998 | Hoddie et al. |
| 5,848,200 | A | 12/1998 | Butler et al. |
| 6,512,837 | B1 | 1/2003 | Ahmed |
| 6,928,196 | B1 * | 8/2005 | Bradley et al. ............... 382/300 |
| 2003/0077000 | A1 | 4/2003 | Blinn et al. |
| 2003/0189579 | A1 | 10/2003 | Poper |

OTHER PUBLICATIONS

Tom Duff, "Polygon Scan Conversion by Exact Convolution", Raster Imaging and Digital Typography, Proceedings of the International Conference, Ecole Polytechnique Federale Lausanne, Oct. 1989, pp. 154-168.
Max, Nelson L. "Antialiasing Scan-Line Data". 1990. Computer Graphics and Applications, IEEE. vol. 10, Issue 1. pp. 18-30.

* cited by examiner

*Primary Examiner* — Aaron M Richer
(74) *Attorney, Agent, or Firm* — Blakely, Sokoloff, Taylor & Zafman LLP (57) ABSTRACT

Methods and apparatuses for anti-aliasing scan conversion. In one aspect of the invention, an exemplary method to scan convert an image on a data processing system includes: sampling the image in a first direction to generate first signals for points along a second line in a second direction using a closed form solution for a convolution integral with a first kernel; and weighting the first signals for the points according to a second kernel in the second direction to generate a second signal for a pixel. In one example according to this aspect, the closed form solution is tabulated in a look up table. After entries are looked up from the look up table according to the image along a first line in the first direction on a first point of the points, the entries are combined to generate one of the first signals for the first point.

25 Claims, 9 Drawing Sheets

METHOD AND APPARATUS FOR ANTI-ALIASING SCAN CONVERSION

This application is a continuation of U.S. patent application Ser. No. 12/271,817, filed on Nov. 14, 2008, which is a divisional application of U.S. patent application Ser. No. 10/328,546, filed on Dec. 24, 2002, now issued as U.S. Pat. No. 7,453,470.

FIELD OF THE INVENTION

The invention relates to digital image processing, and more particularly to anti-aliasing scan conversion.

BACKGROUND OF THE INVENTION

Anti-aliasing scan conversion is used to generate a pixel image, defined on a rectangular array of pixels on a display device such as a Cathode Ray Tube (CRT) or a Light Emitting Diode (LED) display, from an original image (e.g., an image represented using geometric data (which may be specified by mathematical expressions) such as lines and curves describing the outlines of the image, which may be a line or a polygon, or the image of an alphanumeric character specified by a font). Since the pixel image is represented on a regularly spaced array of discrete points on the display device, the pixel image may have jagged edges, gross misrepresentation, or missing details. Many anti-aliasing scan conversion methods have been developed to efficiently generate the pixel image from the original image with minimum distortions or artifacts.

Anti-aliasing scan conversion typically averages a portion of the original image to determine the signal level (sometimes referred to as "coverage") for a pixel. Since the scheme for averaging is generally the same for all the pixels, such methods for anti-aliasing scan conversion may be viewed as convolution of an image with a sampling kernel. The sampling kernel determines the weight for averaging at least a portion of the original image in determining the signal level for a pixel according to the position of the pixel.

Figure 2:
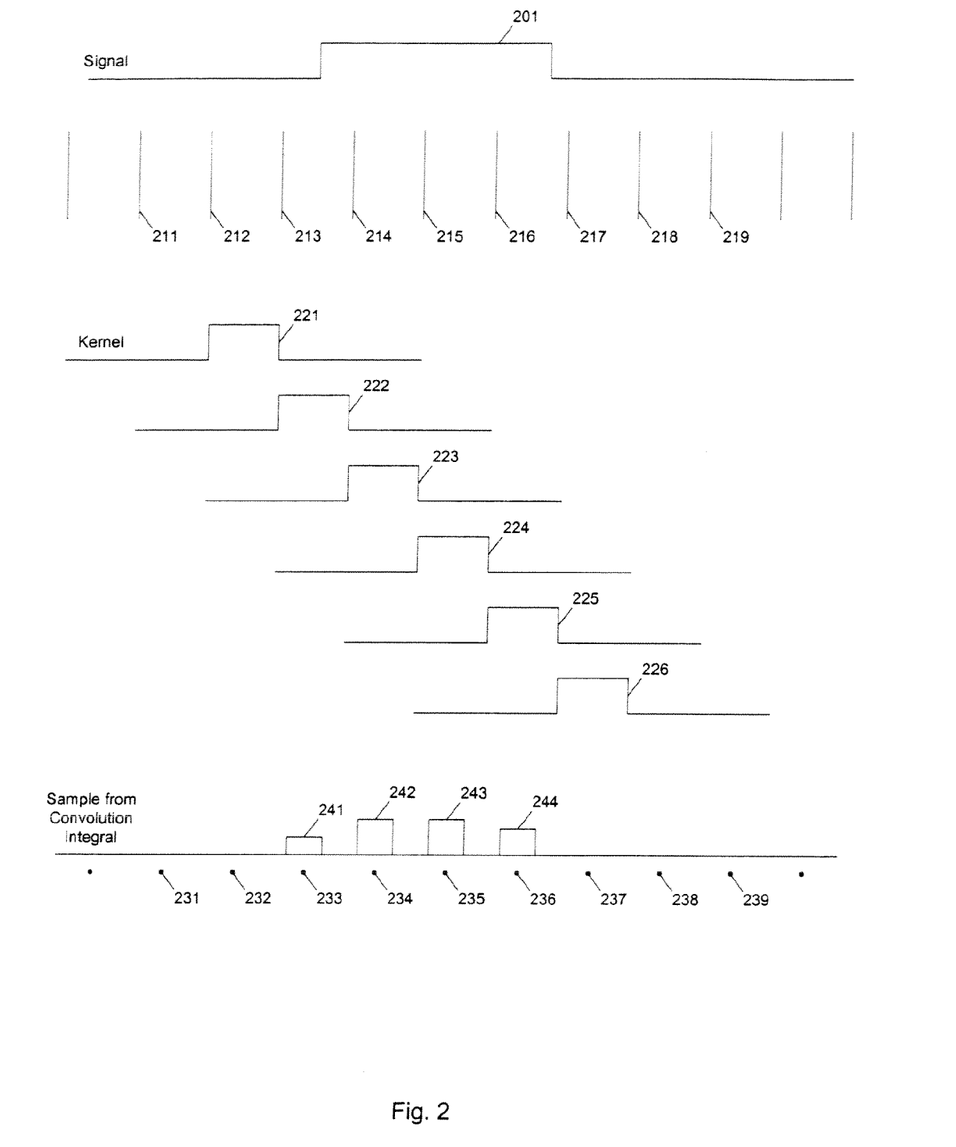
FIG. 2 illustrates a method to anti-aliasing scan convert a one-dimensional signal using a convolution approach.

FIG. 2 illustrates a method to anti-aliasing scan convert a one-dimensional signal using a convolution approach. Signal 201 represents the original signal, which is to be represented at the center points of the mesh formed by lines 211-219. For each of the sample points, a weight function, determined by a sampling kernel, is used to compute a weighted average of a neighboring portion of the original signal to produce a sampled signal level for the sample point. For example, weight function 222 weights the portion of signal 201 between lines 213 and 214 to produce sampled signal 241 for sample point 233. Since the weight function is non-zero for the portion of signal 201 between lines 213 and 214, signal level 241 is an average of this portion of signal 201 weighted according to the non-zero values in the corresponding portion of weight function. Similarly, weight functions 221-226 of the same form are used to compute weighted averages of signal 201 in generating sampled signal levels for points 232-237.

If the original signal is denoted as s(x) and the sampling kernel is denoted as f(x), the sampled signal p at point x can be expressed by the following convolution integral.

$$p(x) = \int_{-\infty}^{+\infty} s(u)f(u-x)du \quad (1)$$

From the above convolution integral, it is seen that the weight function for the sample point at $x=x_0$ is $f(u-x_0)$, which is specified by the sampling kernel f(x) according to the position of the sample point.

Figure 3:
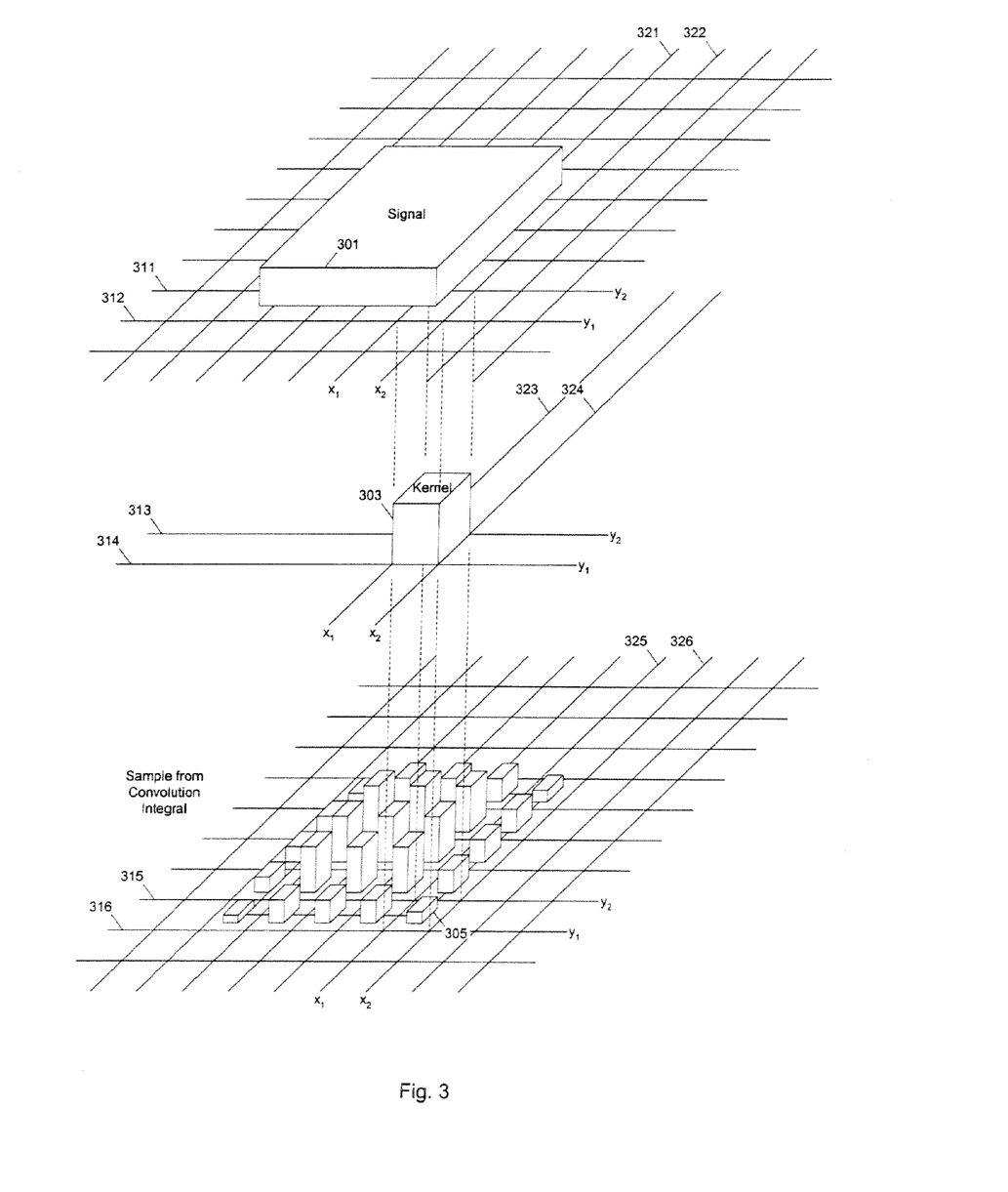
FIG. 3 illustrates a method to anti-aliasing scan convert an image using a two-dimensional convolution approach.

FIG. 3 illustrates a method to anti-aliasing scan convert an image using a two-dimensional convolution approach. Similar to the one-dimensional approach of FIG. 2, weight functions of the same form, determined by a sampling kernel, are used to compute the weighted averages of portions of the original image to obtain the sampled signal levels for all pixels. For example, signal 301 is sampled on a rectangular mesh of pixels. Weight function 303 is non-zero in the area between lines 323 and 324 (at $x=x_1$ and $x=x_2$ respectively) and lines 313 and 314 (at $y=y_1$ and $y=y_2$ respectively). Thus, the portion of signal 301 between lines 321 and 322 and between lines 311 and 312 is averaged with the weight according to weight function 303 to generate sampled signal level 305 for the pixel, which is between lines 325 and 326 and between lines 315 and 316. Weight functions in the same form of function 303 are used to obtain the weighted averages of signal 301 in producing the sampled signal levels for all the pixels on the mesh.

If the original signal of the image is denoted as s(x, y) and the sampling kernel is denoted as f(x, y), the sampled signal p at point (x, y) can be expressed by the following convolution integral.

$$p(x,y) = \int_{-\infty}^{+\infty}\int_{-\infty}^{+\infty} s(u,v)f(u-x,v-y)dudv \quad (2)$$

Some anti-aliasing scan conversion methods use a closed form solution of the convolution integral; and the formula for the closed form solution is evaluated at every pixel position. Such approaches typically have best performance if the formula for the closed form solution is not complicated, but limit the choice of sampling kernels to those where the closed form solutions can be found. Some methods use kernels in the form of piecewise polynomials. Although closed form solutions can be found for the kernels in the form of piecewise polynomials, the closed form solutions typically are complicated with conditional operations. More details about using the kernels in the form of piecewise polynomials may be found in the article: "Polygon scan conversion by exact convolution", by Tom Duff in *Raster Imaging and Digital Typography*, Proceedings of the International Conference, Cambridge University Press, 1989, pp. 154-168.

Some methods use supersampling at the locations of the pixels (e.g., point-sampling, stochastic sampling, or using a numerical integration method to compute weighted averages of values evaluated at discrete points in the areas of integration). A number of point-samples are collected from the signal to compute a weighted sum of these samples to generate the sampled signal level for a pixel. Such methods of supersampling are computationally expensive, as several evaluations per pixel are needed, but more flexible as only the weights need to be changed to accommodate different kernels.

SUMMARY OF THE DESCRIPTION

Methods and apparatuses for anti-aliasing scan conversion are described here.

At least one embodiment of the present invention scan converts an image using closed form solutions in one direction and supersampling the image in the other direction. Computationally less expensive solutions can be found for various different types of kernels when closed form solutions are required only in sampling in one direction. The evaluation of the closed form solutions is computationally more efficient than supersampling.

In one aspect of the invention, an exemplary method to scan convert an image on a data processing system includes: sampling the image in a first direction to generate first signals for points along a second line in a second direction using a closed form solution for a convolution integral with a first kernel; and weighting the first signals for the points according to a second kernel in the second direction to generate a second signal for a pixel. In one example according to this aspect, the closed form solution is tabulated in a look up table. After entries are looked up from the look up table according to the image along a first line passing a first point of the points in the first direction, the entries are combined to generate one of the first signals for the first point. In one example, the closed form solution is a solution to an integral of the first kernel; in another example, the closed form solution is a solution to a convolution integral of a signal with the first kernel. In one example, the first kernel is a piecewise polynomial function.

In another embodiment of the invention, a method to scan convert an image on a data processing system includes: combining entries looked up from a look up table according to the image along first lines in a first direction to generate first signals for a plurality of points along a second line in a second direction; and weighting the first signal for the plurality of points according to a second kernel in the second direction to generate a second signal for a pixel of a pixel image for the image. Each of the first lines is on one of the plurality of points; and each of the first signals represents a signal being sampled at one of the plurality of points with a first kernel in the first direction using a convolution integral approach. In one example, each entry of the look up table is determined from an integral of the first kernel or from a convolution integral of a signal with the first kernel; and the convolution integral is evaluated using a closed form solution or a supersampling method. In one example, the first kernel is a piecewise polynomial function.

In yet another exemplary embodiment, a method to convert an image (e.g., from a first format to a second format) on a data processing system includes: processing image data in a first direction to generate first data for points along a second direction, which is substantially transverse to the first direction, using a first scan conversion techniques; processing the first data in the second direction using a second scan conversion technique which is different than the first scan conversion technique; and displaying an image on a display device, the image resulting from the processing of the first data in the second direction. In this yet another exemplary embodiment, one of the scan conversion techniques may include a look up operation which uses a precomputed look up table which is derived from a closed form solution of a convolution integral.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
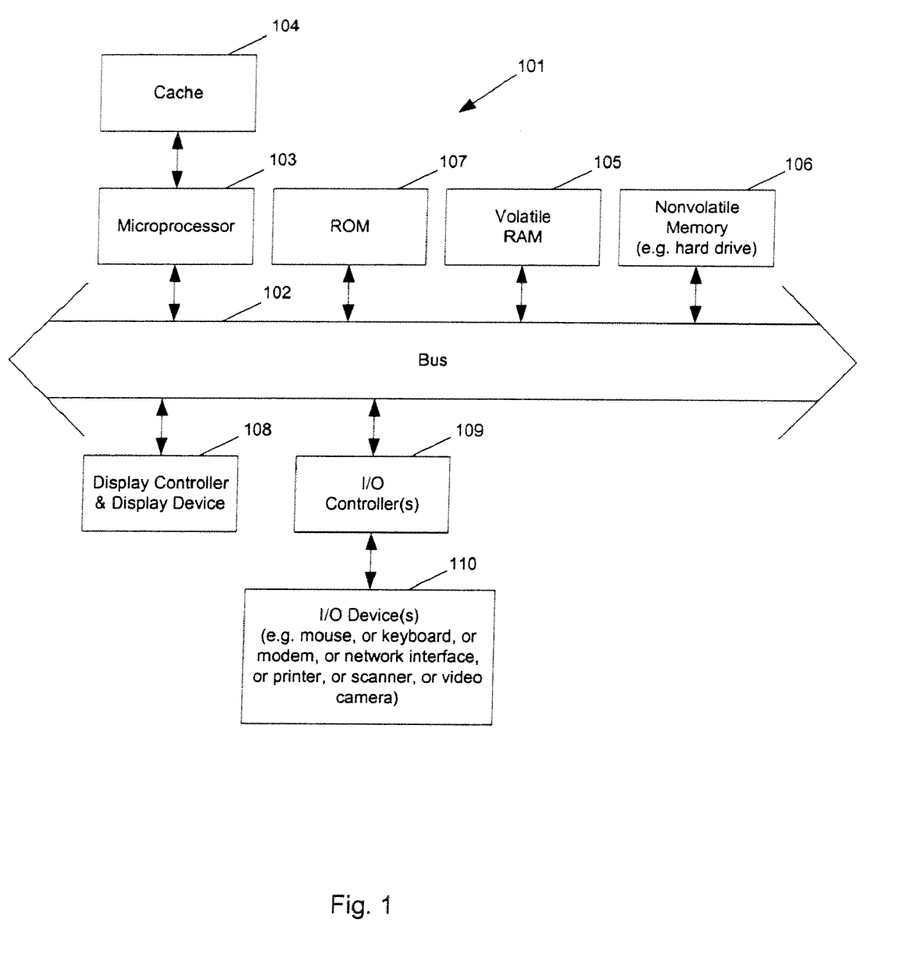
FIG. 1 shows a block diagram example of a data processing system which may be used with the present invention. This exemplary system includes a display device, such as a CRT or a Liquid Crystal Display (LCD) or LED display device on which a scan converted image may be displayed.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor (or multiple processors), such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to scan convert an image using closed form solutions in one direction of the image and supersampling the image in the other direction. Since closed form solutions are required only in sampling in one direction, computationally less expensive solutions can be found for various different types of kernels. Since the closed form solutions are used, the methods of the present invention are more efficient than conventional methods that supersample the image in both directions. The result of the scan converted image can then be displayed on a display device, such as display device 108 which may be a CRT, or an LCD or an LED display device, or other suitable device.

Figure 4:
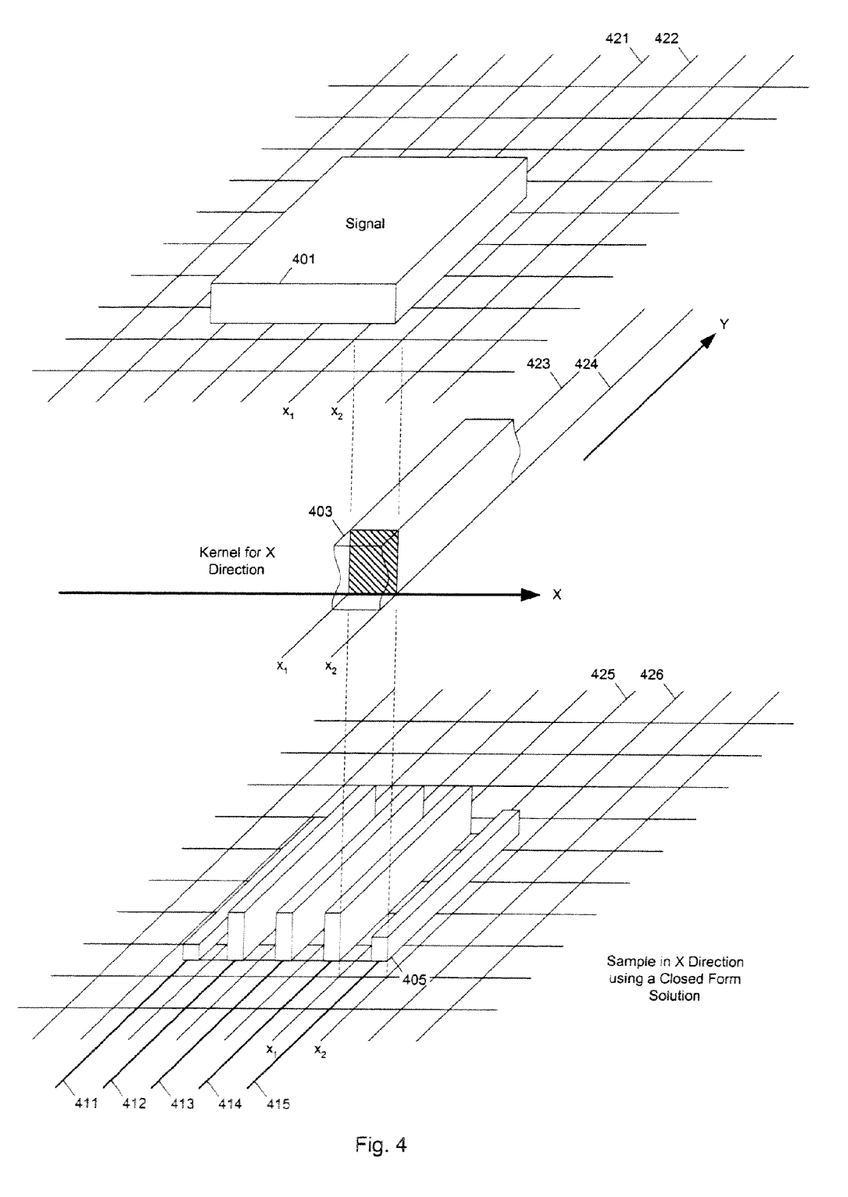
FIGS. 4-5 illustrate a method to anti-aliasing scan convert an image using a closed form solution in one direction according to one embodiment of the present invention.
Figure 5:
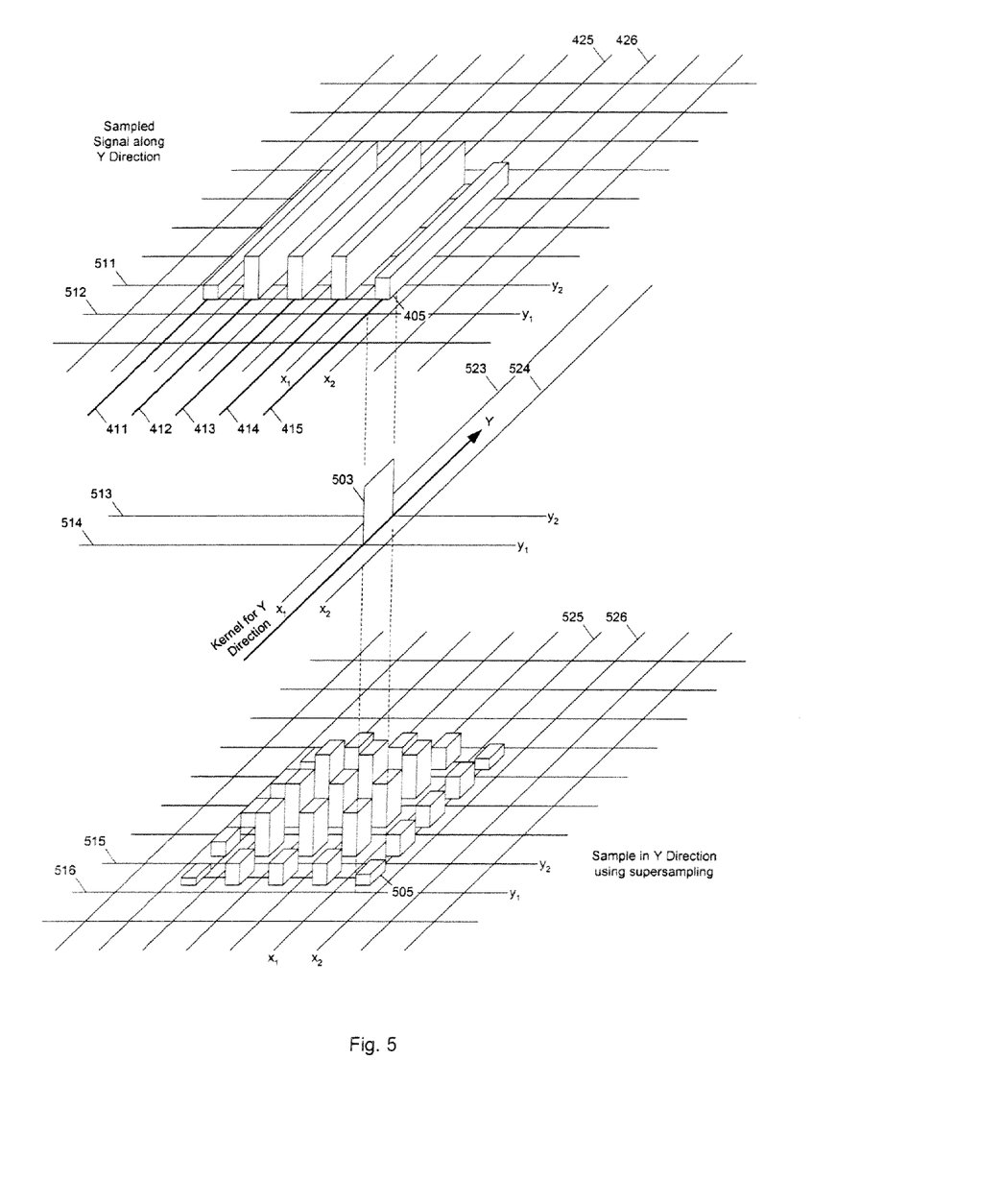

FIGS. 4-5 illustrate a method to anti-aliasing scan convert an image (e.g., represented in terms of mathematical expressions (e.g., polynomials) which represent geometric data, such as lines and curves describing the outline of a shape to be rendered) using a closed form solution in one direction according to one embodiment of the present invention. FIG. 4 illustrates the method to scan convert the image in the x direction. Although FIG. 4 illustrates an image represented in terms of geometric data describing the outlines, wherein the image is one color (e.g., black) inside the outlines and another color (e.g., white) outside the outlines, it is understood that the methods described below can also be applied to other types of images (e.g., an image represented in terms of gray scale intensity (or color components, such as R, G, B) described in piecewise polynomial functions within outlines specified by geometric data, or other image representations). Only a portion of weight function 403 is shown in FIG. 4. It is understood that the weight function 403 extends in both directions along the y-axis to infinity (or the boundary of the image). A sampling kernel of the form of weight function 403 is used to weight the image along the x direction to generate sampled signals along lines in the y direction. For example, weight function 403 is used to average in the x direction the portion of image 401 that is between lines 421 and 422 to generate sampled signal 405 along line 415, where lines 425 and 426 are at $x=x_1$ and $x=x_2$, corresponding to lines 423 and 424 and lines 421 and 422. Since a closed form solution for the convolution integral is used, the values of sampled signal 405 at any point can be evaluated from the closed from solution. Similar to signal 405, the sampling kernel can be used to produce weighted averages for sampled signals along lines 411-414. Thus, scan conversion of the image in the x direction essentially converts two-dimensional signal 401 into a number of one-dimensional signals along lines 411-415. The one-dimensional signals along lines 411-415 can be supersampled to generate signals at pixels on these lines, which will be described below.

Once the image is averaged (sampled, or scan converted) in the x direction, for example, using a closed form solution, supersampling is used to generate signal levels for all pixels, as illustrated in FIG. 5. For example, sampled signal 405 along line 415 is essentially a one-dimensional signal, which can be evaluated from the closed form solution for the convolution of the image with the kernel in the form of weight function 503. Weight function 503 is used in averaging the portion of one-dimensional signal 405 between lines 511 and 512 to generate signal level 505 for the pixel that is between lines 515 and 516 and between lines 525 and 526. Since it is in general difficult to obtain computationally inexpensive closed form solutions for the integration of the signals generated from the convolution in the x-direction, supersampling is used to compute signal level 505. For example, signal 405 between lines 511 and 512 is evaluated at a number of points to generate samples; and weights according to the weight function 503 are used to generate signal level 505 from a weighted average of the samples. After sampled signal 405 on lines 415 is scan converted using a supersampling scheme to generate signal levels for the pixels between lines 525 and 526, the same procedure can be repeated for scan converting the sampled signals on other lines in the y direction (e.g., the signals on lines 411-414).

If signal 401 is denoted as s(x, y) and the sampling kernel corresponding to weight function 403 is denoted as f(x), the sampled signal p at point (x, y) along a line in the y direction can be expressed by the following convolution integral.

$$p(x,y)=\int_{-\infty}^{+\infty}s(u,y)f(u-x)du \qquad (3)$$

If weight function 503 is denoted as g(y), the sampled signal level q at a pixel located at (x, y) can be expressed by the following convolution integral.

$$q(x,y)=\int_{-\infty}^{+\infty}p(x,v)g(v-y)dv \qquad (4)$$

Thus, the result of supersampling in the y direction after convolving in the x direction using a closed form solution, as illustrated in FIGS. 4 and 5, can be expressed as the following convolution integral, when the above two equations are combined.

$$q(x,y)=\int_{-\infty}^{+\infty}\int_{-\infty}^{+\infty}s(u,v)f(u-x)g(v-y)dudv \quad (5)$$

Thus, the result of the method of FIGS. 4 and 5 is equivalent to that scan converted from the image with a two-dimensional convolution approach using a separable kernel f(x) g(y). Typically, kernels f(x) and g(y) are of the same form. However, different kernels may be used for f(x) and g(y), since a closed form solution is used for the integration in one direction (e.g., for kernel f(x)) and supersampling is used for the integration in the other direction (e.g., for kernel g(y)). Since p(x, y) is evaluated from a closed form formula (or from a look up table which may be derived from the closed from formula), the method of FIGS. 4 and 5 essentially converts the problem of scan converting a two-dimensional image into supersampling a series of one-dimensional signals derived from the image on a number of lines.

In one embodiment of the present invention, the image to be scan converted is a black and white image (e.g., a precisely defined shape, such as a circle, a polygon, or a curve, or the image of a character specified by a font), where signal s(x, y) is one in the area of black and zero in the area of white. The convolution integral in Eq. 3 is evaluated from a closed form formula for the integration of the kernel. For example, p(x, y) may be evaluated using the following definite integral of the kernel.

$$p(x,y)=\int_{a(y)}^{b(y)}f(u-x)du, \text{ or} \quad (6)$$

$$p(x,y)=\int_{-\infty}^{b(y)}f(u-x)du-\int_{-\infty}^{a(y)}f(u-x)du \quad (7)$$

where the image along the line y is black only on the segment between points (a(y), y) and (b(y), y).

If the image along the line y is black along several disjoint segments, on which the corresponding value for the sampling kernel is not zero, the sampled signal p(x, y) is the summation of the integral of the sampling kernel on the segments. For example, if the black segments are between $(a_i(y), y)$ and $(b_i(y), y)$, i=1, 2, ..., n, p(x, y) may be evaluated using the following summations.

$$p(x, y) = \sum_{i=1}^{n} \int_{a_i(y)}^{b_i(y)} f(u - x) du, \text{ or} \quad (8)$$

$$p(x, y) = \sum_{i=1}^{n} \left( \int_{-\infty}^{b_i(y)} f(u - x) du - \int_{-\infty}^{a_i(y)} f(u - x) du \right) \quad (9)$$

In another embodiment of the present invention, the image to be scan converted is not a black and white image (rather it is a color image having color components such as RGB); and, the signal for the image is in a polynomial distribution (e.g., a piecewise polynomial distribution, or others), for which a solution for the convolution integral in Eq. 3 can be computed from a closed form formula or one or more look up tables.

Figure 6:
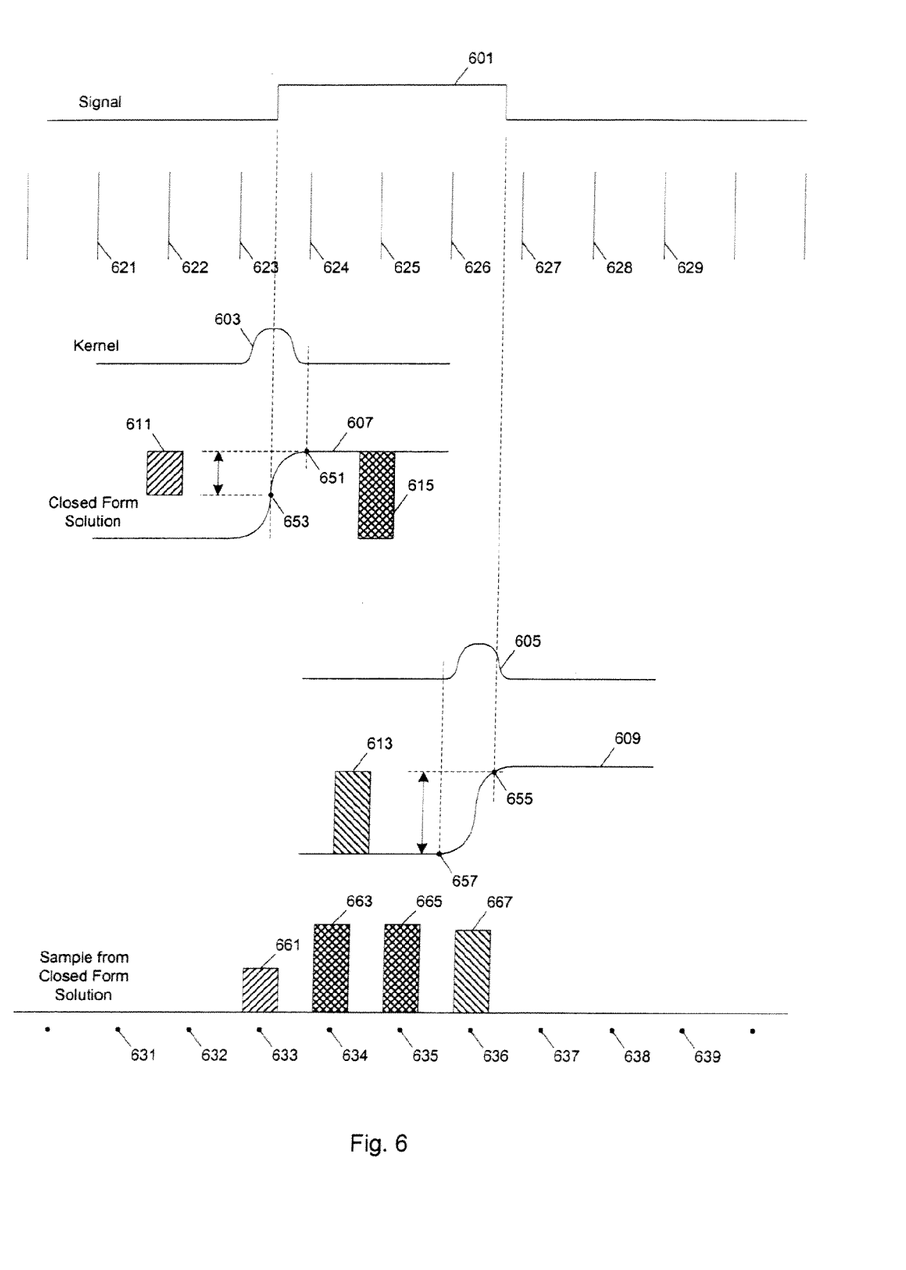
FIG. 6 illustrates a method of anti-aliasing scan conversion in one of the directions according to one embodiment of the present invention.

FIG. 6 illustrates a method of anti-aliasing scan conversion in one of the directions according to one embodiment of the present invention. The method of FIG. 6 can be used to evaluate p(x, y) as in Eq. 6-9. Signal 601 is sampled on the mesh of lines 621-629 to general signal levels on locations 631-639. Weight function 603 can be integrated as function 607. In one embodiment of the present invention, function 607 is represented as a closed form formula, which is evaluated to compute the weighted average for the region between lines 623 and 624. In another embodiment of the present invention, function 607 is tabulated in a look up table for quantized integration limits so that an approximation of the integral can be efficiently computed from the entries of the look up table (e.g., from a nearest entry in the look up table, or from an interpolation based on a number of entries in the look up table). Since the integrand for averaging signal 601 with weight function 603 is non-zero between points 653 and 651 and zero everywhere else, signal level 661 is determined from difference 611 of function 607 between point 653 and 651. Similarly, difference 613 of function 609 between points 657 and 655 is the weighted average of signal 601 for pixel 636. Since weight function 605 is in the same form of weight function 603, function 609 is in the same form of function 607.

Figure 7:
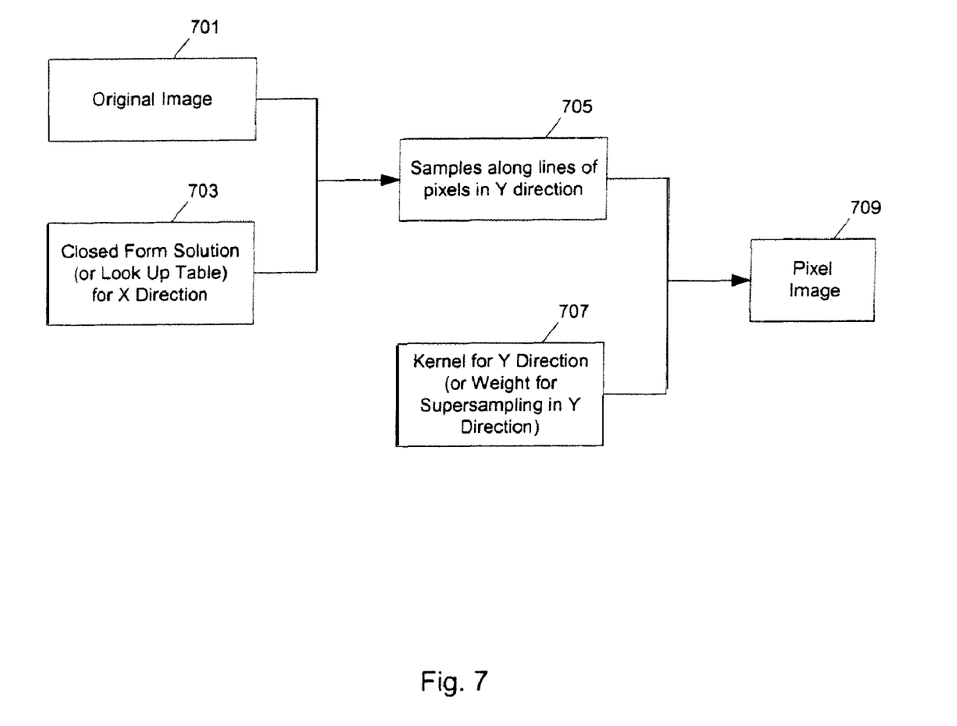
FIG. 7 illustrates a diagram of anti-aliasing scan conversion according to one embodiment of the present invention.

FIG. 7 illustrates a diagram of anti-aliasing scan conversion according to one embodiment of the present invention. Closed form solution 703 (or look up table) for sampling in the x direction is used to scan convert the original image 701 into samples 705 along lines of pixels in the y direction. Samples 705 along the lines of pixels in the y direction are averaged according to the weight for kernel 707 to scan convert signals in the y direction to generate the signal levels for pixel image 709. Although samples 705 along lines of pixels in the y direction are explicitly evaluated from the closed form solution 703 (or look up table) in FIG. 7, it is understood that each of samples 705 typically involves two or more terms evaluated from solution 703 (see Eqs. 7-9) and that the process of combining (summing) these terms for samples 705 may be combined with supersampling with weights according to kernel 707. When the process of combining these terms for samples 705 is combined with the process of supersampling, samples 705 may not be explicitly expressed at any stage. However, since all the terms for samples 705 are evaluated from closed form solution 703, which are combined in the process of supersampling, samples 705 are essentially evaluated. Thus, it is understood that since all the corresponding terms for samples 705 are evaluated from closed form solution 703 (or look up table), samples 705 are considered to be evaluated, even if combining of the terms is performed with supersampling.

Although the weight functions according to the example sampling kernels in FIGS. 4-6 have non-zero values only in the cells for the corresponding sampling points (e.g., function 603 is non-zero in the cell between lines 623 and 624 for point 633), other types of kernel, such as the kernel in Eq. 10 or a kernel as a piecewise polynomial function, can also be used with methods of various embodiments of the present invention.

$$\text{sinc}x = \frac{\sin(\pi x)}{\pi x} \quad (10)$$

For example, a solution to the integral of the kernel is used in scan converting a black and white image in one direction. When a closed form formula is available for the integration of the kernel, the formula can be evaluated to compute the sampled signals scan converted from the image in one direction. When a closed form formula is not available (or computationally expensive to evaluate), a look up table can be generated for evaluating the integration of the kernel. Supersampling in the other direction can be used to finally obtain the signal level for each pixel from the sampled signals generated from the image using the closed form formula or the look up table.

Figure 8:
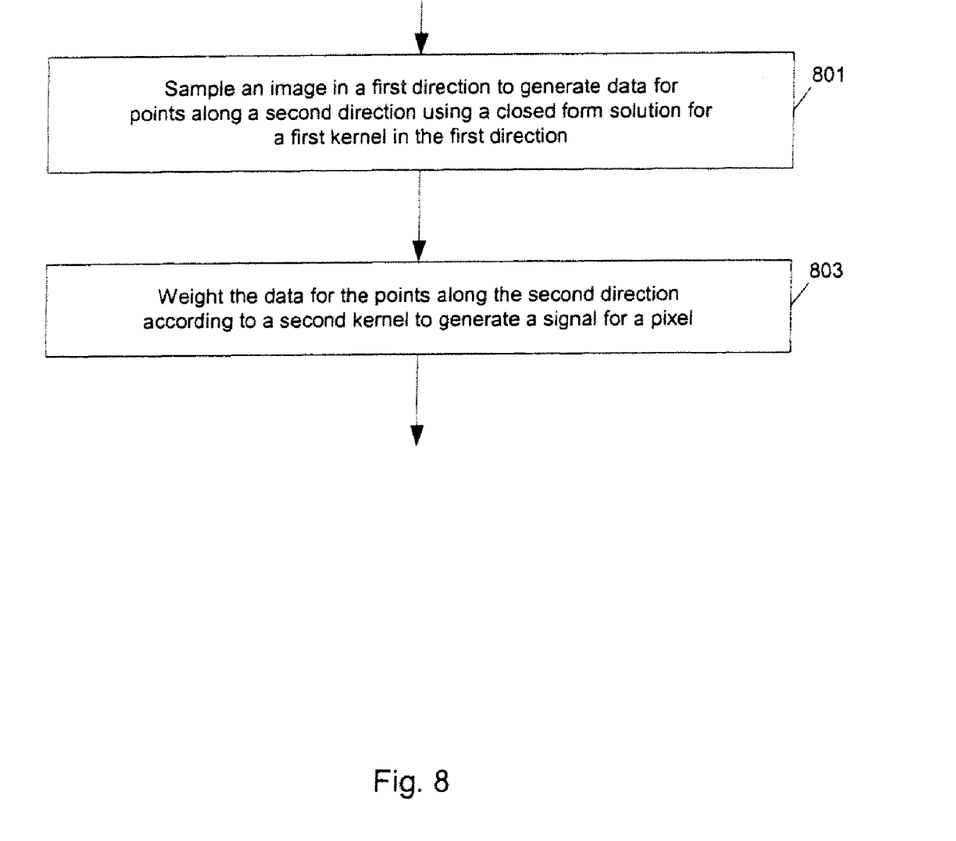
FIG. 8 illustrates a flow chart for a method to anti-aliasing scan convert an image according to one embodiment of the present invention.

FIG. 8 illustrates a flow chart for a method to anti-aliasing scan convert an image according to one embodiment of the present invention. After operation 801 samples an image in a first direction to generate data for points along a second direction using a closed form solution for a first kernel in the first direction, operation 803 weights the data for the points along the second direction according to a second kernel to generate a signal for a pixel. When a closed form formula is not available or not computationally efficient to evaluate, a look up table can be used. Interpolations based on entries of the look up table may be used for increased accuracy with additional computational costs. In one embodiment of the present invention, operation 801 explicitly evaluates the sampled signals generated from scan converting in the first direction; and operation 803 scan converts the sampled signals using supersampling. In another embodiment of the present invention, operation 801 only evaluates the terms for the sampled signals from the closed form solutions; and operation 803 combines the terms with weights according to the second kernel with supersampling.

Figure 9:
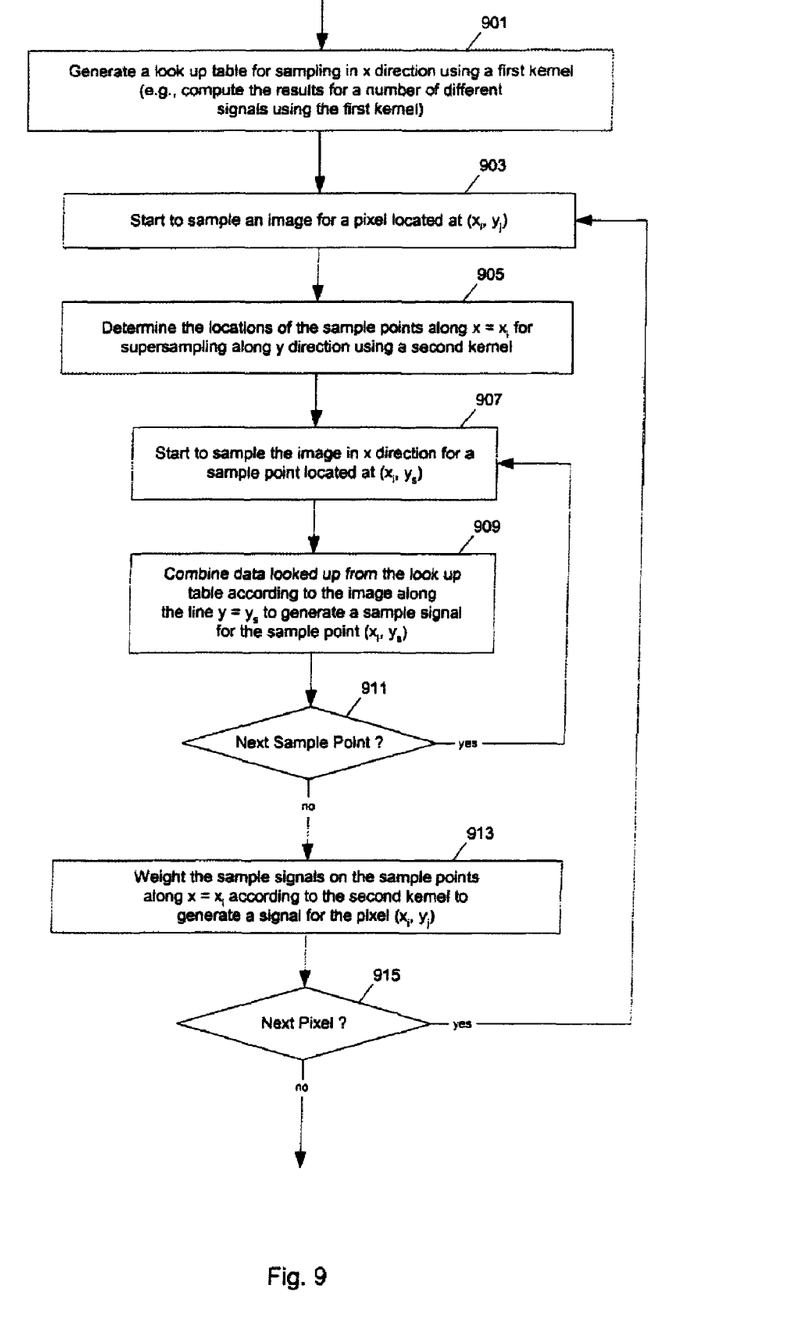
FIG. 9 illustrates a detailed flow chart for a method to anti-aliasing scan convert an image according to one embodiment of the present invention.

FIG. 9 illustrates a detailed flow chart for a method to scan convert an image according to one embodiment of the present invention. Operation 901 generates a look up table for sampling in x direction using a first kernel. For example, the result for sampling at x=0 for a signal that is one in $(-\infty, x_i)$ and zero in $(x_i, \infty)$ is computed for entry i (i=1, 2, ..., n) for scan converting a black and white image. Thus, entry i represents the result of sampling a signal at point x=0, which changes from one to zero at $x=x_i$. Operation 903 starts to sample an image for a pixel located at $(x_i, y_j)$. Operation 905 determines the locations of the sample points (e.g., point $(x_i, y_s)$) along $x=x_i$ for supersampling along the y direction using a second kernel. Operation 907 starts to sample the image in the x direction for a sample point located at $(x_i, y_s)$. Operation 909 combines data looked up from the look up table according to the image along the line $y=y_s$ to generate a sample signal for the sample point $(x_i, y_s)$. For example, if the image along line $y=y_s$ is black on the segment between $(x_m, y_s)$ and $(x_n, y_s)$, entries $e_m$ and $e_n$, corresponding to the results of sampling at x=0 for signals changing at $x_m-x_i$ and $x_n-x_i$ respectively, can be looked up for the look up table; and the sampled signal for point $(x_i, y_s)$ is simply $e_n-e_m$. Operations 907 and 909 are repeated until operation 911 determines that all sample points for supersampling in the y direction along $x=x_1$ for pixel $(x_i, y_j)$ are processed. Then, operation 913 weights the sample signals on the sample points along $x=x_i$ according to the second kernel to generate a signal for the pixel $(x_i, y_j)$. Operations 903-913 are repeated until operation 915 determines that the image is scan converted for all pixels.

Since evaluating a closed form formula or looking up entries from a look up table is generally faster than supersampling, methods of various embodiments of the present invention are generally faster than conventional methods of supersampling for two dimensional images. The points of samples collected for determining the signal level for a pixel are reduced from a matrix of points to a line of points. The amount of computation is reduced from $O(n^2)$ to $O(n)$, where n is the number of points for supersampling in one direction. When compared to conventional methods of using only closed form solutions, methods of various embodiments of the present invention reduce the task of seeking a closed for solution (or look up table) from a two-dimensional problem to a one-dimensional problem. Methods of one embodiment of the present invention are suitable for processors with vector units. In one embodiment of the present invention, vector registers are used to store rows of pixels (e.g., 4 or 8 pixels wide) in the horizontal direction. Since supersampling is typically more suitable for vectorized operations than evaluating the analytical solutions, it is preferred to use supersampling in the horizontal direction, the same direction for storing pixels in the vector register, and the closed-form solution in the other direction, the vertical direction, so that the vector units of a CPU can be fully utilized for better performance. In some embodiments of the present invention, the methods for scan conversion are implemented in hardware.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to convert an image on a data processing system, the method comprising:
processing, by the data processing system, a representation of image data in a vertical direction to generate first data using a convolution integral technique;
supersampling, by the data processing system, the first data to produce points in a horizontal direction; and
computing a weighted sum of the points in the horizontal direction to generate pixels of a displayed image, the pixels being stored in a vectorized circuit that stores a row of pixels in the horizontal direction.

2. A method as in claim 1 wherein the row of pixels is 4 or 8 pixels wide.

3. A method as in claim 1 further comprising:
displaying the displayed image on a display device.

4. A method as in claim 3 wherein the display device is a CRT, LCD or LED display.

5. A method as in claim 1 wherein the convolution integral technique includes a look up operation.

6. A method as in claim 5 wherein the look up operation uses a precomputed look up table.

7. A method as in claim 6 wherein the precomputed look up table is derived from a closed form solution of a convolution integral.

8. A machine readable non-transitory medium containing executable computer program instructions which when executed by a data processing system cause said system to perform a method to convert an image on the data processing system, the method comprising:
processing a representation of image data in a vertical direction to generate first data using a convolution integral technique;
supersampling the first data to produce points in a horizontal direction; and
computing a weighted sum of the points in the horizontal direction to generate pixels of a displayed image, the pixels being stored in a vectorized circuit that stores a row of pixels in the horizontal direction.

9. A medium as in claim 8 wherein the row of pixels is 4 or 8 pixels wide.

10. A medium as in claim 8 wherein the method further comprising:
displaying the displayed image on a display device.

11. A medium as in claim 10 wherein the display device is a CRT, LCD or LED display.

12. A medium as in claim 8 wherein the convolution integral technique includes a look up operation.

13. A medium as in claim 12 wherein the look up operation uses a precomputed look up table.

14. A medium as in claim 13 wherein the precomputed look up table is derived from a closed form solution of a convolution integral.

15. A data processing system to convert an image, the data processing system comprising:
means for a processor to:

process a representation of image data in a vertical direction to generate first data using a convolution integral technique;
supersample the first data to produce points in a horizontal direction; and
compute a weighted sum of the points in the horizontal direction to generate pixels of a displayed image; and means for a vectorized circuit to store the pixels, wherein the vectorized circuit stores a row of pixels in the horizontal direction.

16. A data processing system as in claim 15 wherein the means for a processor further displays the displayed image on a display device.

17. A data processing system as in claim 15 further comprising means for storing a lookup table, wherein the convolution integral technique includes a look up table operation and wherein the look up table operation uses a precomputed look up table derived from a closed form solution of a convolution integral.

18. A method to convert an image on a data processing system, the method comprising:
processing, by the data processing system, a representation of image data in a first direction to generate first data using a convolution integral technique;
supersampling, by the data processing system, the first data to produce points in a second direction which is transverse to the first direction; and
computing a weighted sum of the points in the second direction to generate pixels of a displayed image, the pixels being stored in a vectorized circuit that stores a row of pixels in the second direction.

19. A method as in claim 18 further comprising:
displaying the displayed image on a display device.

20. A method as in claim 18 wherein the convolution integral technique includes a look up operation and wherein the look up operation uses a precomputed look up table which is derived from a closed form solution of a convolution integral.

21. A machine readable non-transitory medium containing executable computer program instructions which when executed by a data processing system cause said system to perform a method to convert an image on the data processing system, the method comprising:
processing a representation of image data in a first direction to generate first data using a convolution integral technique;
supersampling the first data to produce points in a second direction which is transverse to the first direction; and
computing a weighted sum of the points in the second direction to generate pixels of a displayed image, the pixels being stored in a vectorized circuit that stores a row of pixels in the second direction.

22. A medium as in claim 21 wherein the method further comprising:
displaying the displayed image on a display device.

23. A medium as in claim 21 wherein the convolution integral technique includes a look up operation.

24. A medium as in claim 23 wherein the look up operation uses a precomputed look up table.

25. A medium as in claim 24 wherein the precomputed look up table is derived from a closed form solution of a convolution integral.

* * * * *